US010275053B2

(12) United States Patent
Roland et al.

(10) Patent No.: US 10,275,053 B2
(45) Date of Patent: Apr. 30, 2019

(54) INPUT DEVICE WITH A ROTATIONAL SIDE BUTTON

(71) Applicant: RAZER (ASIA-PACIFIC) PTE. LTD., Singapore (SG)

(72) Inventors: Yusuf Ali Roland, Batam (ID); Rafael Raymund Villanueva Viernes, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/742,729

(22) PCT Filed: Jul. 9, 2015

(86) PCT No.: PCT/SG2015/050207
§ 371 (c)(1),
(2) Date: Jan. 8, 2018

(87) PCT Pub. No.: WO2017/007422
PCT Pub. Date: Jan. 12, 2017

(65) Prior Publication Data
US 2018/0210563 A1 Jul. 26, 2018

(51) Int. Cl.
*G06F 3/0362* (2013.01)
*G06F 3/0354* (2013.01)

(52) U.S. Cl.
CPC ........ *G06F 3/0362* (2013.01); *G06F 3/03543* (2013.01)

(58) Field of Classification Search
CPC ............................ G06F 3/0362; G06F 3/03543
See application file for complete search history.

(56) References Cited

U.S. PATENT DOCUMENTS

| 6,417,842 | B1 | 7/2002 | Shattuck |
| 6,525,713 | B1 | 2/2003 | Soeta et al. |
| 6,714,188 | B1 | 3/2004 | Zebuhr et al. |
| 6,828,958 | B2 | 12/2004 | Davenport |
| 7,233,318 | B1 | 6/2007 | Farag et al. |
| 7,808,479 | B1 | 10/2010 | Hotelling et al. |
| 8,508,479 | B2 | 8/2013 | Du et al. |

(Continued)

FOREIGN PATENT DOCUMENTS

| CN | 103760996 A | 4/2014 |
| KR | 20-2010-0008887 U | 9/2010 |
| WO | 200188898 A1 | 11/2001 |

OTHER PUBLICATIONS

"GAMDIAS ZEUS Laser Gaming Mouse Review" Sep. 10, 2014, Nikktech (Year: 2014).*

(Continued)

*Primary Examiner* — Peter D McLoone
(74) *Attorney, Agent, or Firm* — Polsinelli PC

(57) ABSTRACT

A mouse with multiple side buttons may provide a user with ease of accessing buttons and assigning macro keys to each buttons. However, such a mouse may not take into account the comfort and feel of the user when engaging with the buttons, and manipulation of the side buttons can cause strain or fatigue to the hands. According to various embodiments, an input device comprises: a housing; a plurality of buttons; and an actuator configured to change a position of the plurality of buttons relative to the housing.

19 Claims, 4 Drawing Sheets

(56) References Cited

U.S. PATENT DOCUMENTS

| | | |
|---|---|---|
| 8,614,677 B2 | 12/2013 | Ma et al. |
| 8,803,804 B2 | 8/2014 | Kao |
| 2003/0076303 A1 | 4/2003 | Huppi |
| 2008/0297476 A1 | 12/2008 | Hotelling et al. |
| 2012/0081284 A1 | 4/2012 | Wu |
| 2012/0139841 A1 | 6/2012 | Taylor et al. |

OTHER PUBLICATIONS

Extended European Search Report dated Jul. 27, 2018, 8 pages, for the corresponding European Patent Application No. 15897841.1.

* cited by examiner

INPUT DEVICE WITH A ROTATIONAL SIDE BUTTON

TECHNICAL FIELD

Various embodiments generally relate to input devices.

BACKGROUND

A mouse with multiple side buttons may provide a user with ease of accessing buttons and assigning macro keys to each buttons. However, such a mouse may not take into account the comfort and feel of the user when engaging with the buttons. Typically, manipulation of the side buttons can cause strain or fatigue to the hands. Thus, there may be a need to provide comfort and ease of use to prevent thumb strain or fatigue from prolonged use.

SUMMARY OF THE INVENTION

According to various embodiments, an input device comprising: a housing; a plurality of buttons; and an actuator configured to change a position of the plurality of buttons relative to the housing.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1:
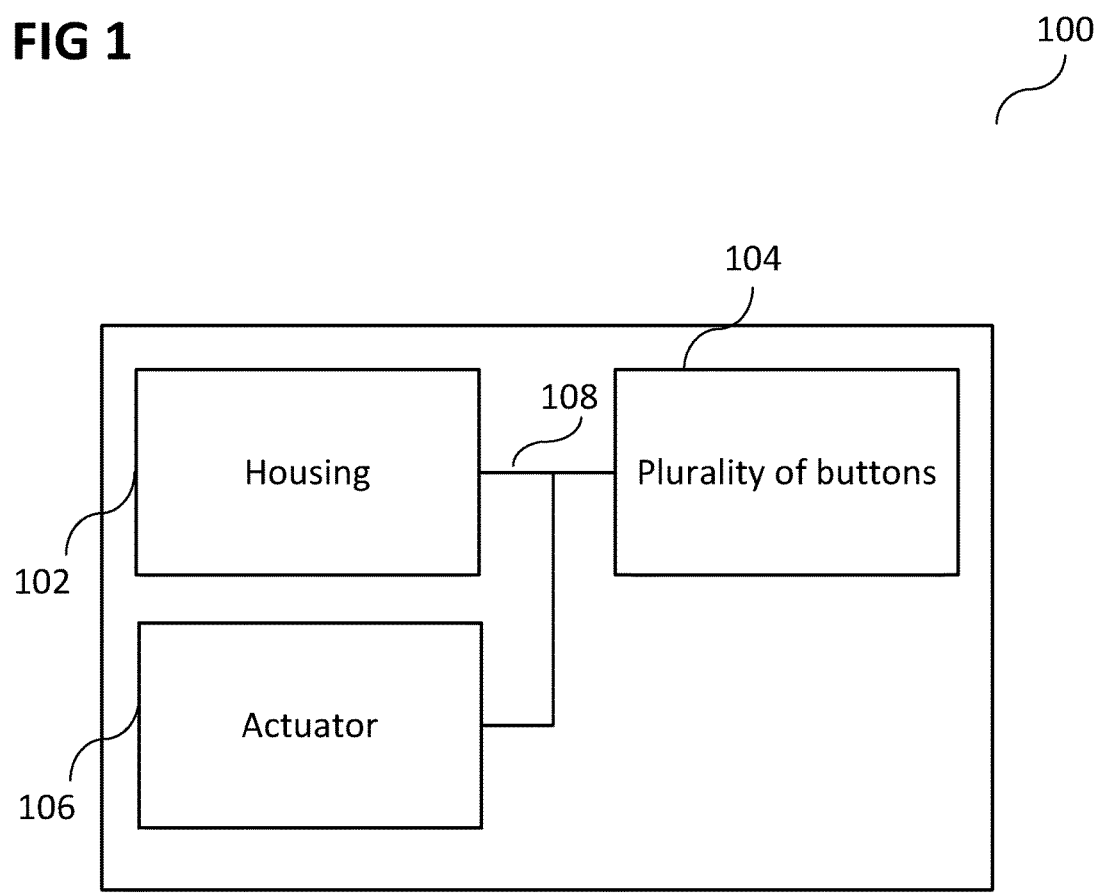
FIG. 1 shows an input device according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

A mouse with multiple side buttons may provide a user with ease of accessing buttons and assigning macro keys to each buttons. However, such a mouse may not take into account the comfort and feel of the user when engaging with the buttons. However, manipulation of the side buttons can cause strain or fatigue to the hands.

According to various embodiments, the ergonomics of a mouse having multiple side buttons may be improved to provide additional comfort and ease of use to prevent thumb strain or fatigue from prolonged use.

According to various embodiments, rotational side button for an input device may be provided.

According to various embodiments, an input device with a rotating dial may be provided.

FIG. 1 shows an input device 100 according to various embodiments. The input device 100 may include a housing 102. The input device 100 may further include a plurality of buttons 104. The input device 100 may further include an actuator 106 (for example a manual actuator) configured to change a position of the plurality of buttons 104 relative to the housing 102. The housing 102, the plurality of buttons 104, and the actuator 106 may be connected, for example mechanically connected, like illustrated by lines 108.

In other words, according to various embodiments, upon manual actuation of the actuator, a plurality of buttons may change their position (or orientation) relative to the housing of the input device.

According to various embodiments, the plurality of buttons 104 may be provided on a dial.

According to various embodiments, the actuator 106 may be configured to change the orientation of the dial with respect to an axis of the dial.

According to various embodiments, the actuator 106 may be connected to the axis of the dial.

According to various embodiments, the actuator 106 may be operable from outside of the housing.

According to various embodiments, the actuator 106 may include a rotational wheel.

According to various embodiments, the rotational wheel may be connected to the plurality of buttons 104 via an assembly holder.

According to various embodiments, the rotational wheel may be connected to the plurality of buttons 104 via a printed circuit board assembly.

According to various embodiments, the rotational wheel may be connected to the plurality of buttons 104 via a button shaft.

According to various embodiments, the input device 100 may include or may be or may be included in a mouse.

According to various embodiments, thumb strain or fatigue from prolonged use from a mouse with multiple side buttons may be prevented.

According to various embodiments, a solution to the above problem may be provided by having an actuator located on the bottom of the mouse for rotating the side buttons so that the side buttons can be adjusted to a desired and comfortable position for the user.

Figure 2A:
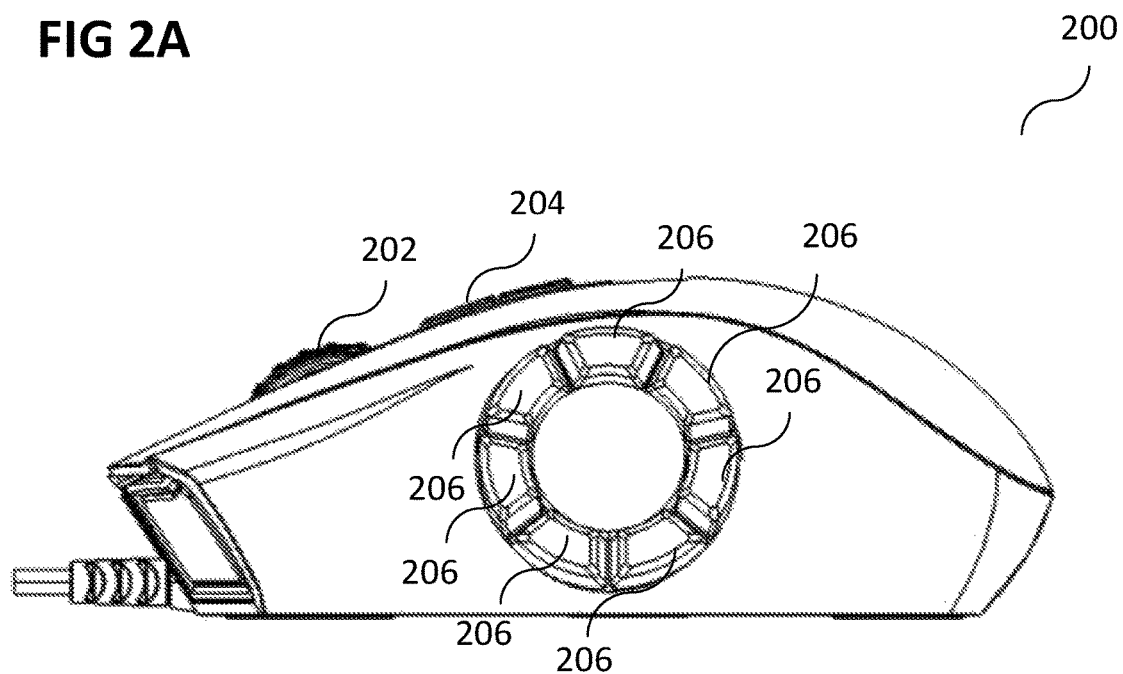
FIG. 2A shows an illustration of a side view of an input device according to various embodiments.

FIG. 2A shows an illustration 200 of a side view of an input device (for example mouse) with a scroll wheel 202, a top button 204 (or a plurality of top buttons), and a plurality of side buttons 206 according to various embodiments. In FIG. 2A, the original side button position is shown.

Figure 2B:
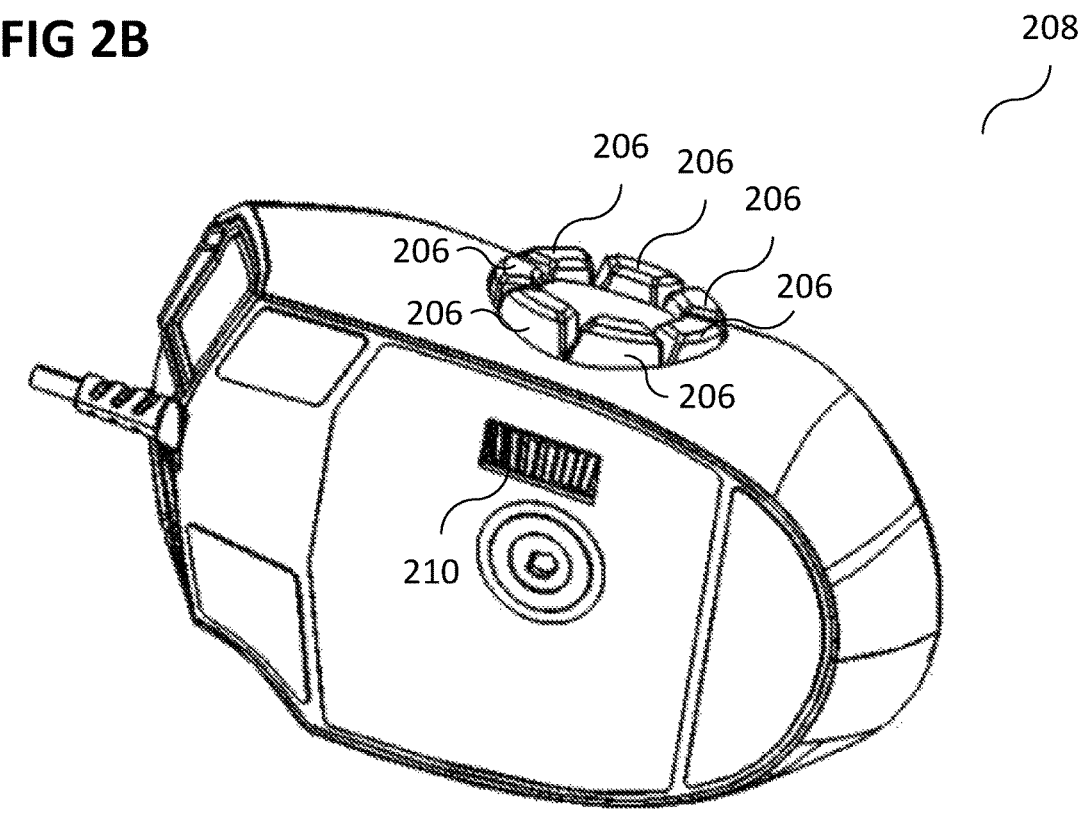
FIG. 2B shows an illustration of a bottom perspective view of the input device shown in FIG. 2A.

FIG. 2B shows an illustration 208 of a bottom perspective view of the input device shown in FIG. 2A. A side button rotational actuation (in other words: actuator) 210 may be provided. In other words, by actuating the actuator 210, the position of each of the side buttons 206 may be changed, for example rotated.

According to various embodiments, rotational side button may be provided. According to various embodiments, the input device may be called Winnie.

Figure 3A:
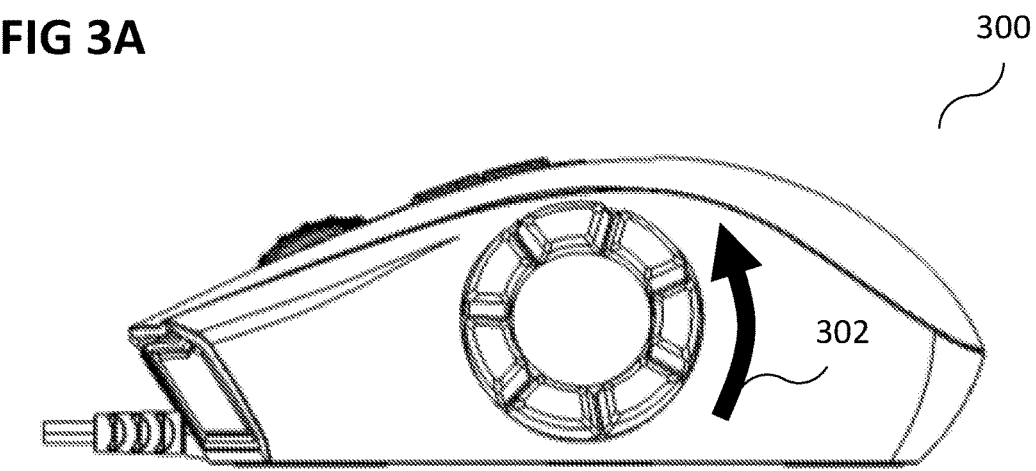
FIG. 3A, FIG. 3B, and FIG. 3C show an illustration of an input device according to various embodiments.

FIG. 3A shows an illustration 300 of an input device (for example a mouse) according to various embodiments in a first position. The buttons may be rotated like indicated by arrow 302 to arrive at a second position.

Figure 3B:
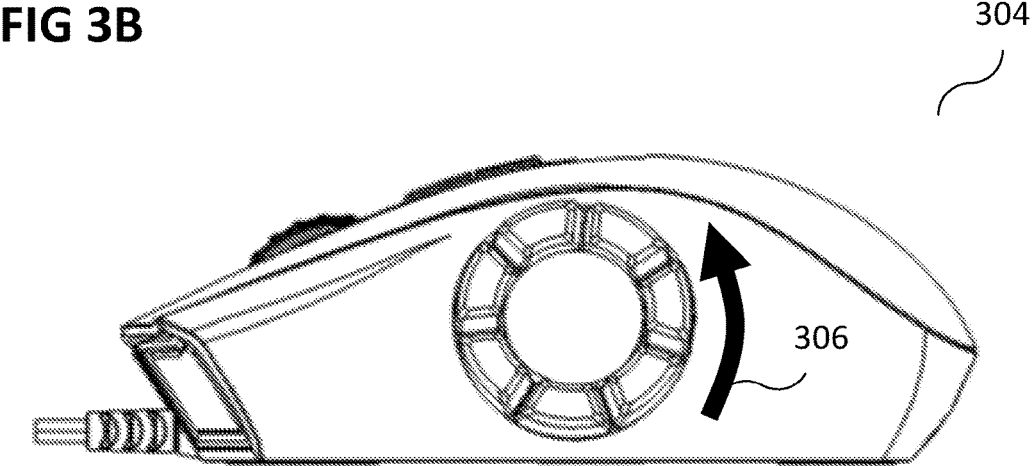

FIG. 3B shows an illustration 304 of the input device (for example a mouse) shown in FIG. 3A, but in a second position. The buttons may be rotated like indicated by arrow 306 to arrive at a third position.

Figure 3C:
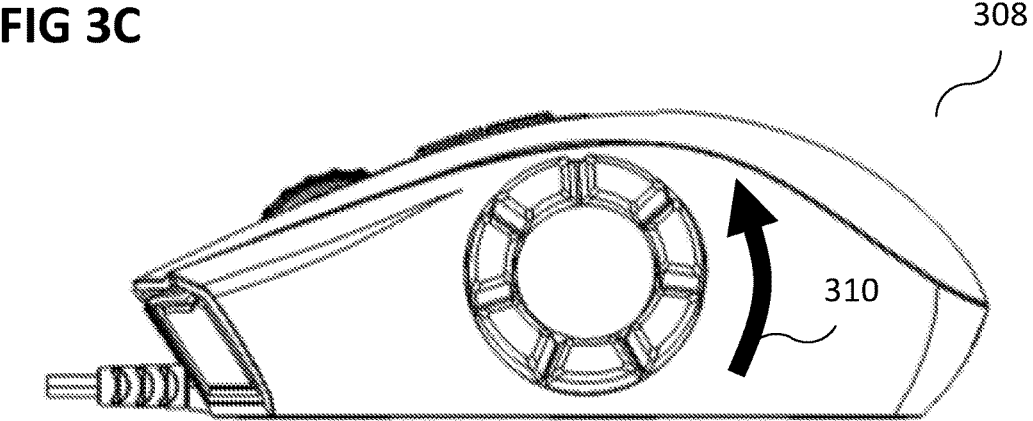

FIG. 3C shows an illustration 308 of the input device (for example a mouse) shown in FIG. 3A, but in a third position. The buttons may be rotated like indicated by arrow 310 to arrive at a further position (for example corresponding to the first position again). According to various embodiments, the function of each of the buttons may be adjusted by software binding. According to various embodiments, the button position may be rotated as per user preference.

Figure 4:
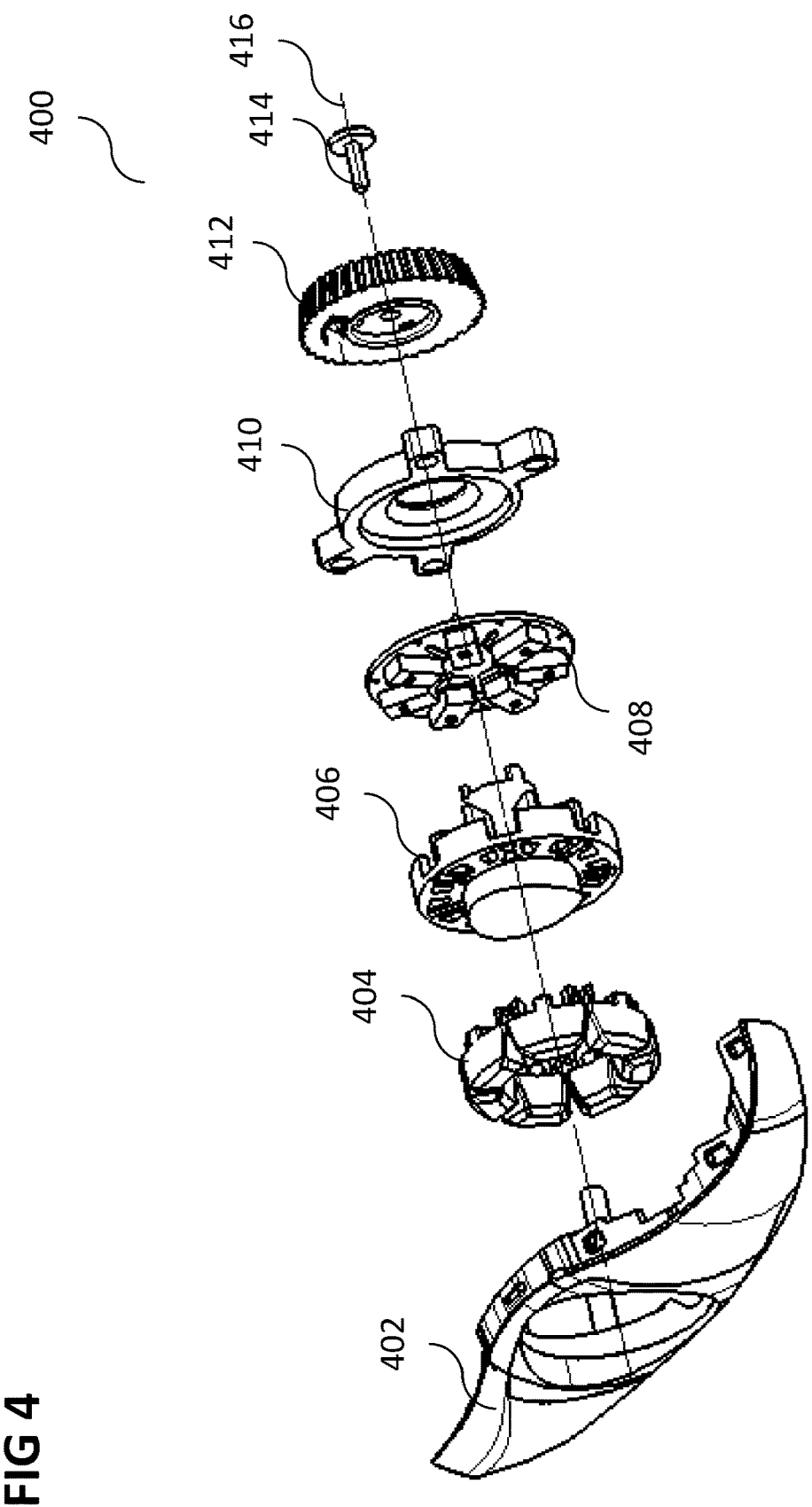
FIG. 4 shows an illustration of an exploded view of a portion of an input device according to various embodiments.

FIG. 4 shows an illustration 400 of an exploded view of a portion of an input device (for example mouse) according to various embodiments. A side cabinet 402, a side button 404, a side button shaft 406, a side button PCBA (printed circuit board assembly) 408, an assembly holder 410, a rotational wheel 412, and a screw 414 are shown. The screw 414 may fix together the entire construction along a rotational axis 416.

Various embodiments may enable adjustment of the side buttons to a desired position on the input device (for example mouse). An actuator located on the bottom of the mouse may rotate the side buttons so that the side buttons maybe adjusted to a desired and comfortable position for the user.

According to various embodiments, an input device (for example mouse) may have a plurality of side buttons. The side buttons may be re-oriented and moved through a base actuator. The side buttons may chiefly be adjusted to minimize hand fatigue and/or thumb fatigue.

According to various embodiments, side buttons (for example on an input device, e.g. mouse) may be displaced or re-oriented through a switch directly on the input device.

The following examples pertain to further embodiments.

Example 1 is an input device comprising: a housing; a plurality of buttons; and an actuator configured to change a position of the plurality of buttons relative to the housing.

In example 2, the subject-matter of example 1 can optionally include that the plurality of buttons are provided on a dial.

In example 3, the subject-matter of example 2 can optionally include that the actuator is configured to change the orientation of the dial with respect to an axis of the dial.

In example 4, the subject-matter of example 3 can optionally include that the actuator is connected to the axis of the dial.

In example 5, the subject-matter of any one of examples 1 to 4 can optionally include that the actuator is operable from outside of the housing.

In example 6, the subject-matter of any one of examples 1 to 5 can optionally include that the actuator comprises a rotational wheel.

In example 7, the subject-matter of any one of examples 1 to 6 can optionally include that the rotational wheel is connected to the plurality of buttons via an assembly holder.

In example 8, the subject-matter of any one of examples 1 to 7 can optionally include that the rotational wheel is connected to the plurality of buttons via a printed circuit board assembly.

In example 9, the subject-matter of any one of examples 1 to 8 can optionally include that the rotational wheel is connected to the plurality of buttons via a button shaft.

In example 10, the subject-matter of any one of examples 1 to 9 can optionally include that the input device is a mouse.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An input device comprising:
   a housing comprising an upper housing surface and a bottom housing surface, opposite the upper housing surface, wherein the bottom housing surface comprises an actuator opening;
   a plurality of buttons; and
   an actuator configured to rotate the plurality of buttons relative to the housing;
   wherein the plurality of buttons is positioned on a side of the housing;
   wherein the actuator is positioned at a bottom of the housing such that the actuator is operable from the actuator opening of the bottom housing surface;
   wherein the plurality of buttons are provided on a dial;
   wherein the actuator comprises a rotational wheel;
   wherein the actuator is connected to an axis of the dial; and
   wherein the actuator is fixed to the plurality of buttons.

2. The input device of claim 1,
wherein the actuator is operable from outside of the housing.

3. The input device of claim 1,
wherein the rotational wheel is connected to the plurality of buttons via an assembly holder.

4. The input device of claim 1,
wherein the rotational wheel is connected to the plurality of buttons via a printed circuit board assembly.

5. The input device of claim 1,
wherein the rotational wheel is connected to the plurality of buttons via a button shaft.

6. The input device of claim 1,
wherein the input device is a mouse.

7. The input device of claim 1, further comprising
a switch configured to displace or rotate the plurality of buttons.

8. The input device of claim 1,
wherein plurality of buttons are configured to rotate about a rotational axis of the actuator.

9. A mouse comprising:
a housing having a sidewall and a bottom surface;
a plurality of buttons disposed on the sidewall to form a circle such that the plurality of buttons are configured to rotate around a rotational axis of the circle; and
a rotational wheel configured to rotate about the rotational axis to actuate the plurality of buttons;
wherein the rotational wheel is positioned inside the housing of the mouse and a portion of the rotational wheel is exposed at the bottom surface via an opening such that the rotational wheel is rotatable by a force applied on the rotational wheel via the opening, to rotate the plurality of buttons, without exerting a force on the plurality of buttons.

10. The mouse of claim 9,
wherein the rotational wheel is connected to the plurality of buttons via an assembly holder.

11. The mouse of claim 9,
wherein the rotational wheel is connected to the plurality of buttons via a printed circuit board assembly.

12. The mouse of claim 9,
wherein the rotational wheel is connected to the plurality of buttons via a button shaft.

13. The mouse of claim 9, further comprising
a switch configured to displace or rotate the plurality of buttons.

14. A mouse comprising:
a housing having a base and a sidewall extending from the base;
a plurality of buttons positioned on the sidewall; and
a rotational wheel positioned inside the housing, the rotational wheel fixed to the plurality of buttons such that a rotation of the rotational wheel causes a corresponding rotation of the plurality of buttons;
wherein the base comprises an opening; and
wherein the rotational wheel is rotatable from the opening of the base.

15. The mouse of claim 14,
wherein the rotational wheel is connected to the plurality of buttons via an assembly holder.

16. The mouse of claim 14,
wherein the rotational wheel is connected to the plurality of buttons via a printed circuit board assembly.

17. The mouse of claim 14,
wherein the rotational wheel is connected to the plurality of buttons via a button shaft.

18. The mouse of claim 14, further comprising
a switch configured to displace or rotate the plurality of buttons.

19. The mouse of claim 14,
wherein plurality of buttons are configured to rotate about a rotational axis of the rotational wheel.

* * * * *